UNITED STATES PATENT OFFICE.

THILO KROEBER, OF BASEL, SWITZERLAND, ASSIGNOR TO THE FIRM OF SOCIETY OF CHEMICAL INDUSTRY IN BASLE, OF BASEL, SWITZERLAND.

BLUE AZO DYE AND PROCESS OF MAKING SAME.

No. 806,415.     Specification of Letters Patent.     Patented Dec. 5, 1905.

Application filed May 22, 1905. Serial No. 261,553. (Specimens.) REISSUED

*To all whom it may concern:*

Be it known that I, THILO KROEBER, chemist and doctor of philosophy, a subject of the Duke of Saxe-Altenburg, and a resident of Basel, Switzerland, have invented new and useful Improvements in the Manufacture of Monoazo Dyestuffs, of which the following is a full, clear, and complete specification.

The invention relates to the manufacture of new monoazo dyestuffs derived from 1-amido-2-acidyloxynaphthalenesulfonic acids and naphtholsulfonic acids, according to the general process described in an application for Letters Patent executed by me and Dr. Karl Jagerspacher, Serial No. 261,897, dated May 23, 1905.

These new monoazo dyestuffs dissolve in water and in concentrated sulfuric acid with blue colorations and dye unmordanted wool Bordeaux tints becoming blue on treatment with chromium compounds—as, for instance, potassium bichromate.

The following example illustrates the manufacture of the new dyestuff: 23.9 kilos of 1-2-amidonaphthol-4-sulfonic acid are dissolved in two hundred liters of water with aid of forty-nine kilos of soda-lye of 30° Baumé and acetylized by means of eleven kilos of acetic anhydrid at a temperature below 0° centigrade, while good stirring is maintained. After a few minutes there are added to the solution, which should have neutral or feebly alkaline reaction, seven kilos of solid sodium nitrate, and the whole is acidified at 0° centigrade by adding all at once thirty kilos of ordinary hydrochloric acid, whereupon the mass immediately solidifies without any evolution of gas to a yellow crystalline magma. This diazo compound is allowed to flow immediately into a solution of twenty-four kilos of 1-5-naphtholsulfonic acid, alkaline with soda. There is first formed a red-violet dyestuff, a part of which separates. By long standing, more quickly on heating to 70° centigrade, a pure-blue dyestuff is obtained, which is precipitated by adding common salt. It dissolves in water and in concentrated sulfuric acid with blue colorations and dyes wool in acid-baths Bordeaux tints, which become blue by subsequent treatment with chromium compounds. By replacing in this example 1-5-naphtholsulfonic acid by the isomeric 1-4-naphtholsulfonic acid the obtained dyestuff of analogous properties becomes more reddish blue by its treatment on wool with chromium compounds.

Instead of the 1-2-amidonaphthol-4-sulfonic acid mentioned in the example, other sulfonic acids of 1-2-amidonaphthol—as, for instance, 1-2-amidonaphthol-6-sulfonic acid, 1-2-amidonaphthol-4-6-disulfonic acid 1-2-amidonaphthol-3-6-disulfonic acid may also be employed.

What I claim is—

1. The process for the manufacture of monoazo dyestuffs by acidylizing sulfonic acids of 1-2-amidonaphthol in the hydroxyl group, then diazotizing the so-obtained amido-2-acidyloxynaphthalenesulfonic acid and combining the resulting diazo compound with naphtholsulfonic acids.

2. The process for the manufacture of monoazo dyestuffs, which process consists in acetylizing sulfonic acids of 1-2-amidonaphthol in the hydroxyl group, then diazotizing the so-obtained 1-amido-2-acetoxynaphthalenesulfonic acids and combining the resulting diazo compounds with naphtholsulfonic acids.

3. The process for the manufacture of a monoazo dyestuff, which process consists in acetylizing 1-2-amidonaphthol-4-sulfonic acid in the hydroxyl group, then diazotizing the so-obtained 1-amido-2-acetoxynaphthalene-4-sulfonic acid and combining the resulting diazo compound with 1-5-naphtholsulfonic acid.

4. As new products the monoazo dyestuffs, derived from sulfonic acids of 1-2-amidonaphthol and naphtholsulfonic acids, which dyestuffs yield blue solutions in water, and in concentrated sulfuric acid and dye unmordanted wool in Bordeaux shades, becoming blue on treatment with chromium compounds.

5. As a new product the monoazo dyestuff, derived from 1-2-amidonaphthol-4-sulfonic acid and 1-5-naphtholsulfonic acid, which dyestuff yields blue solutions in water and in concentrated sulfuric acid and dyes unmordanted wool in Bordeaux shades becoming blue on treatment with chromium compounds.

In witness whereof I have hereunto signed my name, this 9th day of May, 1905, in the presence of two subscribing witnesses.

THILO KROEBER.

Witnesses:
    ALBERT GRAETE,
    AMAND RITTER.